3,014,875
RED-LUMINESCENT SUBSTANCE AND METHOD OF PREPARATION THEREOF

Wilhelmus Polycarpus de Graaf and Jan Lourens Ouweltjes, Eindhoven, Netherlands, assignors to North American Philips Company, Inc., New York, N.Y., a corporation of Delaware
No Drawing. Filed Dec. 23, 1958, Ser. No. 782,384
Claims priority, application Netherlands Jan. 2, 1958
4 Claims. (Cl. 252—301.4)

This invention relates to a source of radiation comprising the combination of a high-pressure mercury vapor discharge tube and a luminescent screen containing a red-luminescent substance, the emission of which upon excitation by the ultraviolet radiation lies substantially wholly above 600 m$\mu$. The invention also relates to a luminescent substance having this red emission and to a method of manufacturing said substance.

British patent specification No. 701,033 discloses a source of rays of the above-mentioned kind, in which the radiation of the red-luminescent substance serves to supplement the red emission which is unduly weak in the radiation of such a discharge tube. This substance is a compound of magnesium oxide, magnesium fluoride and germanium oxide, activated with quadrivalent manganese and obtained by heating and in which per molecule of germanium oxide, the sum of the amount of magnesium oxide and magnesium fluoride in molecules lies between 2 and 4.6.

According to the indications of the said British patent specification, many hundreds of sources of rays have been manufactured which proved quite satisfactory in practice. However, a great disadvantage of the red luminescent substances employed is the high cost of germanium, since germanium is a rare element and can be manufactured from the minerals with difficulty only, more particularly with the degree of purity necessary for the manufacture of luminescent substances.

Substances of the same good luminescent properties have been sought for use in sources of rays of the above-described kind which contain almost exclusively elements which occur in large quantities and from which the required compounds may be obtained at low cost. It has been found that few luminescent substances exist which luminesce so intensely in the desired region and at the same time exhibit the same low temperature dependency of the emission as the above-mentioned germanates, since the latter, even at temperatures of 250° C., retain an emission the quantum efficiency of which is not lower than about 80% of that at room temperature. This is of great importance since the luminescent substances are preferably provided in close proximity to the discharge tubes which have a high temperature.

Experiments having led to the present invention revealed that a portion of the germanium oxide may be substituted by the combination of silicon dioxide and one or both oxides of titanium and tin. The good properties of the non-substituted germanate are then completely retained, whilst in certain cases even additional advantages are obtained.

A source of rays according to the invention comprises the combination of a high-pressure mercury vapor discharge tube and a luminescent screen containing a red-luminescent substance, the emission of which upon excitation by the ultraviolet radiation lies almost completely above 600 m$\mu$ and it is characterized in that the red luminescent substance has a molecular composition which satisfies the formula $a.MgO b.MgF_2.c.GeO_2.p.SiO_2.q.TiO_2.r.SnO_2.z.MnO_2$ wherein $a$ has a value comprised between 3.0 and 3.9
$a+b=4$
$c+p+q+r=1$
$p+q+r$ has a value comprised between 0.10 and 0.40
$p$ has a value comprised between 0.01 and 0.36
$q$ has a value comprised between 0 and 0.36
$r$ has a value comprised between 0 and 0.36

$\dfrac{p}{q+r}$ has a value comprised between 0.1 and 9.0

$z$ has a value comprised between 0.005 and 0.020

As appears from the above-mentioned formula and conditions, a substance according to the invention differs from the above-described substances only in that a portion of the germanium dioxide is substituted by silicon dioxide in combination with one or both oxides of tin and titanium. Since the compounds of silicon, titanium and tin are considerably cheaper than compounds of germanium, it is advantageous to substitute the germanium dioxide by the said three oxides in as large a proportion as possible. However, it has been found that a limit is set to this substitution, since the light output declines too much if the percentage of silicon dioxide, titanium oxide and tin oxide is unduly high. A small decline in the light output is permissible because of the important saving in cost. However, since with determined substitution percentages a higher light output is obtained, as will be explained more fully hereinafter with reference to a few tables, these percentages are preferably chosen.

It has been found that substitution of so large a portion of the germanium oxide that a reasonable economy is obtained, by only one of the oxides of silicon, titanium or tin, or by tin oxide and titanium oxide always leads to a considerably lower light output. A substance for use in a source of rays according to the invention thus always contains silicon dioxide and at least one of the two other oxides.

The manufacture of the red-luminescent substance of the above-mentioned formula is substantially the same as the manufacture of known germanates. By way of illustration three examples now follow hereinafter.

Example I

A mixture is manufactured from

| | |
|---|---|
| 124 gs. of MgO | 6.0 gs. of SiO$_2$ |
| 56 gs. of MgF$_2$ | 8.0 gs. of TiO$_2$ |
| 84 gs. of GeO$_2$ | 0.7 g. of MnO$_2$ |

This mixture is heated in an oxidizing atmosphere, for example air, at a temperature of 1100° C. for 4 hours. The product obtained is subsequently ground and sieved and is then suitable to be provided on the luminescent screen of the source of rays according to the invention. This luminescent screen may be present, for example, either on a reflector or on the inner wall of a bulb surrounding the high-pressure mercury vapor discharge tube.

Example II

A mixture is manufactured from

| | |
|---|---|
| 140 gs. of MgO | 12.0 gs. of SiO$_2$ |
| 31 gs. of MgF$_2$ | 15.1 gs. of SnO$_2$ |
| 74 gs. of GeO$_2$ | 0.9 g. of MnO$_2$ |

This mixture is heated in air at a temperature of 1000° C. for 8 hours. The reaction product obtained is ground and sieved and is then ready for use.

Example III

A mixture is manufactured from

| | |
|---|---|
| 140 gs. of MgO | 8.4 gs. of SiO$_2$ |
| 31 gs. of MgF$_2$ | 2.4 gs. of TiO$_2$ |
| 84 gs. of GeO$_2$ | 4.5 gs. of SnO$_2$ |
| | 1.3 gs. of MnO$_2$ |

This mixture is heated in air at a temperature of 1200° C. for 3 hours. After heating, the reaction product is ground and, if necessary, sieved and is then ready to be provided on the luminescent screen of the source of rays according to the invention.

The table now following shows the light output upon excitation by a radiation of 253.7 mμ of a large number of compounds with the formula $$3.5MgO.0.5MgF_2.1(GeO_2+SiO_2+TiO_2).0.01MnO_2$$

as compared to a non-substituted germanate, the light output of which is assumed to be 100.

In this table, the first horizontal row indicates the ratio $GeO_2/SiO_2+TiO_2$ and the last vertical column indicates the ratio $SiO_2:TiO_2$

| $GeO_2$ | 0.8 | 0.7 | 0.6 | $\frac{SiO_2}{TiO_2}$ |
|---|---|---|---|---|
| $SiO_2+TiO_2$ | 0.2 | 0.3 | 0.4 | |
| | 97 | 89 | 83 | 3:7 |
| | 100 | 97 | 90 | 4:6 |
| | 98 | 99 | 95 | 5:5 |
| | 101 | 98 | 95 | 6:4 |
| | 101 | 98 | 93 | 7:3 |
| | 100 | 94 | 89 | 8:2 |
| | 96 | 89 | 80 | 9:1 |

The table now following indicates in the same manner as above in the first table, the light output, but with the use of tin oxide instead of titanium oxide.

| $GeO_2$ | 0.8 | 0.7 | 0.6 | $\frac{SiO_2}{SnO_2}$ |
|---|---|---|---|---|
| $SiO_2+SnO_2$ | 0.2 | 0.3 | 0.4 | |
| | 93 | 90 | 85 | 3:7 |
| | 95 | 89 | 89 | 4:6 |
| | 96 | 93 | 89 | 5:5 |
| | 98 | 95 | 83 | 6:4 |
| | 98 | 94 | 77 | 7:3 |
| | 94 | 92 | 75 | 8:2 |
| | 93 | 84 | 75 | 9:1 |

In order to give an impression of the light outputs of substances containing, in addition to silicon dioxide, both titanium oxide and tin oxide, compounds have been manufactured with 0.8 mol. of $GeO_2$ and 0.14 mol. of $SiO_2$ and a constant sum, viz. 0.06 mol. of $TiO_2$ and $SnO_2$. The table now following indicates the light outputs of these substances as compared with the light output of a substance with exclusively 1 mol. of $GeO_2$, which is assumed to be 100.

TABLE

| | | | | | | | Light output |
|---|---|---|---|---|---|---|---|
| 3.5 MgO | 0.5 $MgF_2$ | 0.01 $MnO_2$ | 0.8 $GeO_2$ | 0.14 $SiO_2$ | 0.04 $TiO_2$ | 0.02 $SnO_2$ | 106 |
| 3.5 MgO | 0.5 $MgF_2$ | 0.01 $MnO_2$ | 0.8 $GeO_2$ | 0.14 $SiO_2$ | 0.03 $TiO_2$ | 0.03 $SnO_2$ | 104 |
| 3.5 MgO | 0.5 $MgF_2$ | 0.01 $MnO_2$ | 0.8 $GeO_2$ | 0.14 $SiO_2$ | 0.02 $TiO_2$ | 0.04 $SnO_2$ | 99 |

As may appear from the foregoing tables, the light output obtained is not always constant, but there is a region in which the light output is maximum. The red-luminescent substance is therefore preferably chosen so that in the above formula $a$ has a value comprised between 3.0 and 3.9
$a+b=4$
$c+p+q+r=1$
$p+q+r$ has a value comprised between 0.10 and 0.40
$p$ has a value comprised between 0.03 and 0.28
$q$ has a value comprised between 0 and 0.28
$r$ has a value comprised between 0 and 0.28

$\frac{p}{q+r}$ has a value comprised between 0.4 and 2.5

$z$ has a value comprised between 0.005 and 0.020

In order to give an impression of the economy which may be obtained by using the invention, it is mentioned that each source of rays comprising a high-pressure mercury vapor discharge tube of usual size and surrounded by a bulb of approximately spherical shape, having a radius of 5 cms. requires 2 gms. of germanate. This germanate contains .8 g. of germanium oxide if no use is made of the invention. If instead of 1 mol. of germanium oxide, 0.2 mol. is substituted by a mixture of silicon dioxide and titanium dioxide in a ratio 1:1, the cost of coating a bulb is decreased by about 8%. With the actual prices of germanium dioxide, this yields for 1000 bulbs an economy of about 50 guilders.

What is claimed is:

1. A red-luminescent substance, the emission of which upon excitation by ultra violet radiation lies substantially wholly above 600 mμ, said red-luminescent substance having a molecular composition which satisfies the formula:

$$a.MgO.b.MgF_2.c.GeO_2.p.SiO_2.q.TiO_2.r.SnO_2.z.MnO_2$$

wherein $a$ has a value between 3.0 and 3.9
$a+b=4$
$c+p+q+r=1$
$p+q+r$ has a value between 0.10 and 0.40
$p$ has a value between 0.01 and 0.36
$q$ has a value between 0 and 0.36
$r$ has a value between 0 and 0.36

$\frac{p}{q+r}$ has a value between 0.1 and 9.0

$z$ has a value between 0.005 and 0.020

2. The red-luminescent substance of claim 1 which satisfies the formula:

$$a.MgO.b.MgF_2.c.GeO_2.p.SiO_2.q.TiO_2.r.SnO_2.zMnO_2$$

wherein:

$a$ has a value between 3.0 and 3.9
$a+b=4$
$c+p+q+r=1$
$p+q+r$ has a value between 0.10 and 0.40
$p$ has a value between 0.03 and 0.28
$q$ has a value between 0 and 0.28
$r$ has a value between 0 and 0.28

$\frac{p}{q+r}$ has a value between 0.4 and 2.5

$z$ has a value between 0.005 and 0.020

3. A method of manufacturing the luminescent substance of claim 1 wherein a mixture of magnesium oxide, magnesium fluoride, germanium oxide, silicon dioxide, titanium oxide, tin oxide and manganese oxide is heated in an oxidizing atmosphere at a temperature between 1000° and 1200° C. for 1 to 10 hours.

4. The method of claim 3 in which the compounds employed are formed during the heating step.

References Cited in the file of this patent
UNITED STATES PATENTS

| 2,457,054 | Leverenz | Dec. 21, 1948 |
| 2,697,076 | Anderson | Dec. 14, 1954 |

FOREIGN PATENTS

| 1,139,056 | France | June 25, 1957 |